United States Patent
Taylor et al.

(10) Patent No.: US 7,882,528 B1
(45) Date of Patent: Feb. 1, 2011

(54) METHODS AND SYSTEMS FOR ENHANCING A USER'S VIEWING EXPERIENCE

(75) Inventors: Thomas H. Taylor, Redmond, WA (US); Peter J. Potrebic, Calistoga, CA (US)

(73) Assignee: Microsoft Corporation, Redmond, WA (US)

( * ) Notice: Subject to any disclaimer, the term of this patent is extended or adjusted under 35 U.S.C. 154(b) by 2129 days.

(21) Appl. No.: 10/247,903

(22) Filed: Sep. 19, 2002

(51) Int. Cl.
*G06F 3/00* (2006.01)
*G06F 13/00* (2006.01)
*H04N 5/445* (2006.01)

(52) U.S. Cl. .......................................... 725/58; 725/46
(58) Field of Classification Search .................. 725/46, 725/58
See application file for complete search history.

(56) References Cited

U.S. PATENT DOCUMENTS

| | | | |
|---|---|---|---|
| 6,865,746 B1 * | 3/2005 | Herrington et al. | 725/53 |
| 7,055,168 B1 * | 5/2006 | Errico et al. | 725/46 |
| 7,174,126 B2 * | 2/2007 | McElhatten et al. | 455/3.04 |
| 7,369,750 B2 * | 5/2008 | Cheng et al. | 386/83 |
| 2003/0033603 A1 * | 2/2003 | Mori et al. | 725/46 |
| 2003/0093792 A1 * | 5/2003 | Labeeb et al. | 725/46 |
| 2003/0097657 A1 * | 5/2003 | Zhou et al. | 725/46 |
| 2005/0091686 A1 * | 4/2005 | Sezan et al. | 725/46 |
| 2008/0184313 A1 * | 7/2008 | Knudson et al. | 725/58 |

* cited by examiner

*Primary Examiner*—Christopher Kelley
*Assistant Examiner*—Charles N Hicks
(74) *Attorney, Agent, or Firm*—Lee & Hayes, PLLC

(57) ABSTRACT

Methods and systems for enhancing a user's viewing experience are described. Various embodiments can record episodes of a special event program, record previously-broadcast episodes of a special event program, assist the user in recording episodes that are associated with a program for which they have set up a record event, maintain an entertainment system's user interface by automatically removing record events, handle season premiers and finales by automatically recording them, and assist the user in recording episodes in which they might be interested.

28 Claims, 7 Drawing Sheets

METHODS AND SYSTEMS FOR ENHANCING A USER'S VIEWING EXPERIENCE

TECHNICAL FIELD

This invention relates to systems and method for enhancing a user's viewing experience.

BACKGROUND

Home entertainment systems are able to receive a variety of different channels from various sources at any time of the day or night. The channels carry public, cable and/or satellite television programming. When a program is aired at an inconvenient time, such as when the viewer is at work or sleeping, the viewer can typically make arrangements to record the program using, for example, a videocassette recorder ("VCR"), a digital or personal video recorder ("DVR"), and the like. Once recorded, the viewer can play the recorded version of the program at a more convenient time.

Many home entertainment systems utilize an electronic program guide (EPG) along with a hardware/software system that provides the user with an enhanced experience. These systems can enable a user to search the EPG for programs of interest and have those programs automatically recorded so that they can later watch them. Microsoft's UltimateTV® is but one example of a home entertainment system that can greatly enhance a user's viewing experience.

One of the things that more sophisticated home entertainment systems allow, is for the user to record an entire series or season of a particular show. These users can simply set up what is known as a "series record" event via a user interface (UI) that is presented to the user. By specifying a show of interest and selecting the appropriate recording options, the user can have each of the programs of the series recorded to the system's hard disk for later viewing. The system then uses electronic program guide (EPG) data or "metadata" that is associated with the programs described in the EPG data that it receives to identify the programs of interest and record them.

The paradigm just described works fairly well with regularly broadcast programs. For example, a television series whose episodes are broadcast throughout the season, on the same channel and at the same time, is fairly easy to handle. Yet, there are instances that arise fairly frequently that depart from the paradigm of regularly broadcast programs, and which present challenges to system designers who desire to really enhance the user's viewing experience.

As an example, consider what will be referred to in this document as "special event programs", such as those programs that might be related to a regularly broadcast program for which a user has set up a "series record" event. For example, the user may have set up a series record event to record each episode of Gilligan's Island. At some time in the future, perhaps another channel may broadcast a show entitled "The Making of Gilligan's Island", which provides a behind-the-scenes look at the making of this series, as well as interviews with various actors who starred in the show. If the user is interested in the Gilligan's Island series, then there is a very good chance that they would be interested in "The Making of Gilligan's Island". Yet, the series record event that the user set up to record the series episodes will not record this special event. Unless the user physically accesses the EPG and finds the program of interest, they will likely miss a related program which is highly likely to be of interest to them. Accordingly, the user's experience is not all that it might be.

As another example, consider a special event program in the form of a mini-series. A mini-series is typically a made-for-television show that is broken into several episodes that are broadcast sequentially, often on contiguous nights. Examples of mini-series include Roots and Shogun. If a user watches the first episode of a mini-series and finds it interesting enough to want to watch the other episodes, but forgets to set up a series record event on the mini-series, if they are not physically present during the next broadcasts, they will miss one or more of the subsequently broadcast episodes. Again, the user's experience is not all that it might be.

Accordingly, this invention arose out of concerns associated with providing improved methods and systems for enhancing a user's viewing experience.

SUMMARY

Methods and systems for enhancing a user's viewing experience are described. Various embodiments can record episodes of a special event program, record previously-broadcast episodes of a special event program, assist the user in recording episodes that are associated with a program for which they have set up a record event, maintain an entertainment system's user interface by automatically removing record events, handle season premiers and finales by automatically recording them, and assist the user in recording episodes in which they might be interested.

DETAILED DESCRIPTION

Overview

The inventive principles described below can be used in conjunction with any suitable type of entertainment system, such as a home entertainment system. In the discussion that follows, reference will be made to an entertainment system that may be used for displaying and/or recording programs. Within the context of this document, an "entertainment system" can be a display unit, such as a television screen, coupled to a processing device for performing the data processing steps disclosed herein, or can include any number of interconnected consumer electronic devices, one of which having a processing device for performing the data processing steps disclosed herein. Examples of such consumer electronic devices include, without limitation, a video cassette recorder ("VCR"), a personal video recorder (PVR), a digital video recorder (DVR), a video game system, a stereo system, a television or monitor with data processing capabilities, a cable television box, a digital satellite system receiver ("DSS"), a digital video broadcasting system ("DVB"), a digital versatile disc system ("DVD"), a set-top box that serves as an Internet terminal, and any other device capable of processing data as described herein. Furthermore, the term "entertainment system" is to be understood as a term that broadly describes a television-viewing environment, whether it is located in a viewer's home, at a place of business, in the public, or at any other location. Also, in the context of this document, the term "program" as such pertains to broadcast programs includes, when appropriate, the viewable portions of moving image data and/or sound data.

In one exemplary implementation context, the various embodiments can be implemented in a system that uses a conventional television screen or other display unit to display information and can include, as an example, an UltimateTV® set-top box or a similar Internet terminal that has been adapted to perform the operations that include composing, sending and receiving email, browsing the World Wide Web ("Web"), accessing other segments of the Internet, and otherwise displaying information. An Internet terminal typically uses standard telephone lines, Integrated Services Digital Network (ISDN) lines, cable lines associated with cable television service, or the like to connect to the Internet or other wide area networks.

Figure 7:
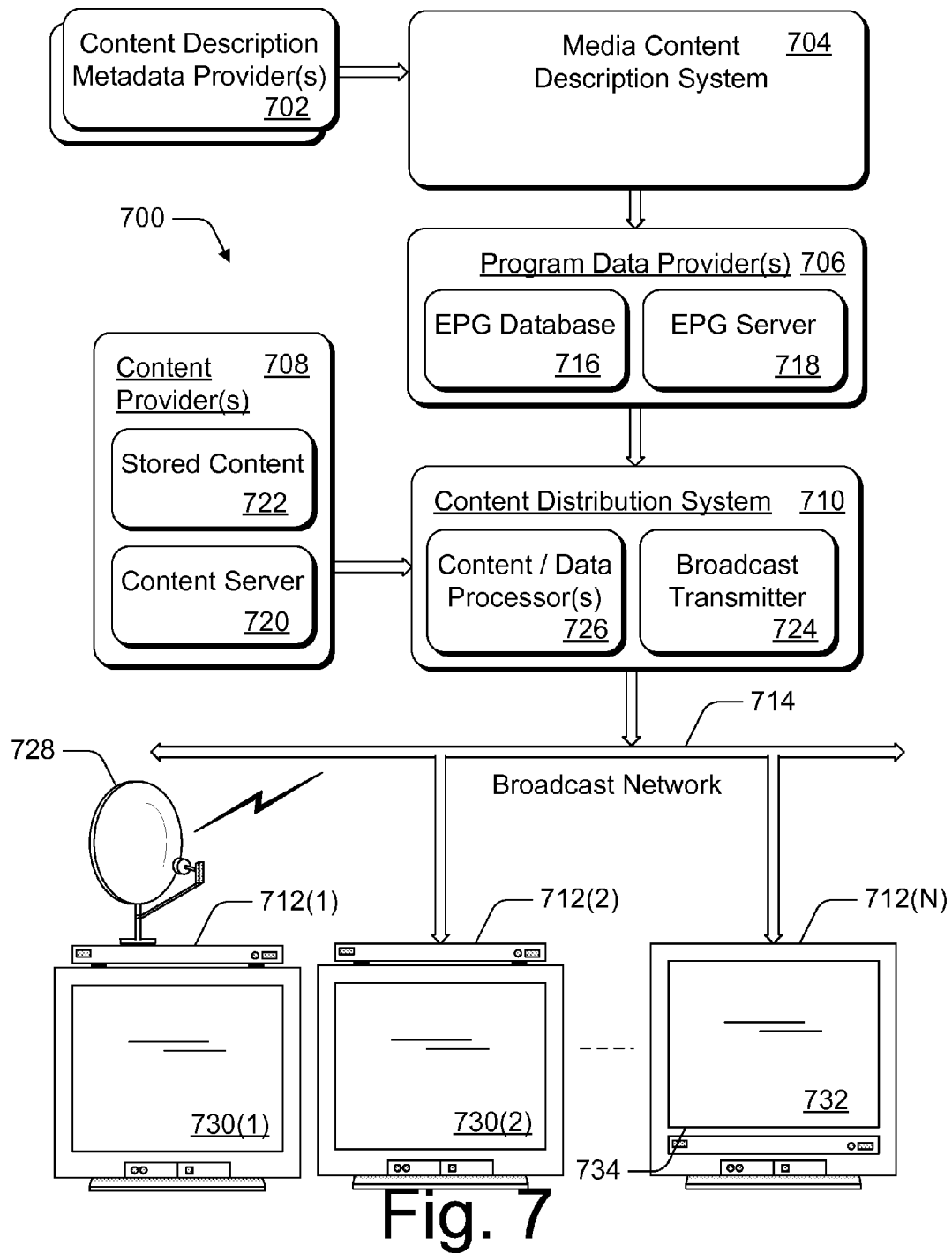
FIG. 7 is a block diagram of an exemplary environment in which one or more of the inventive embodiments can be implemented.
Figure 8:
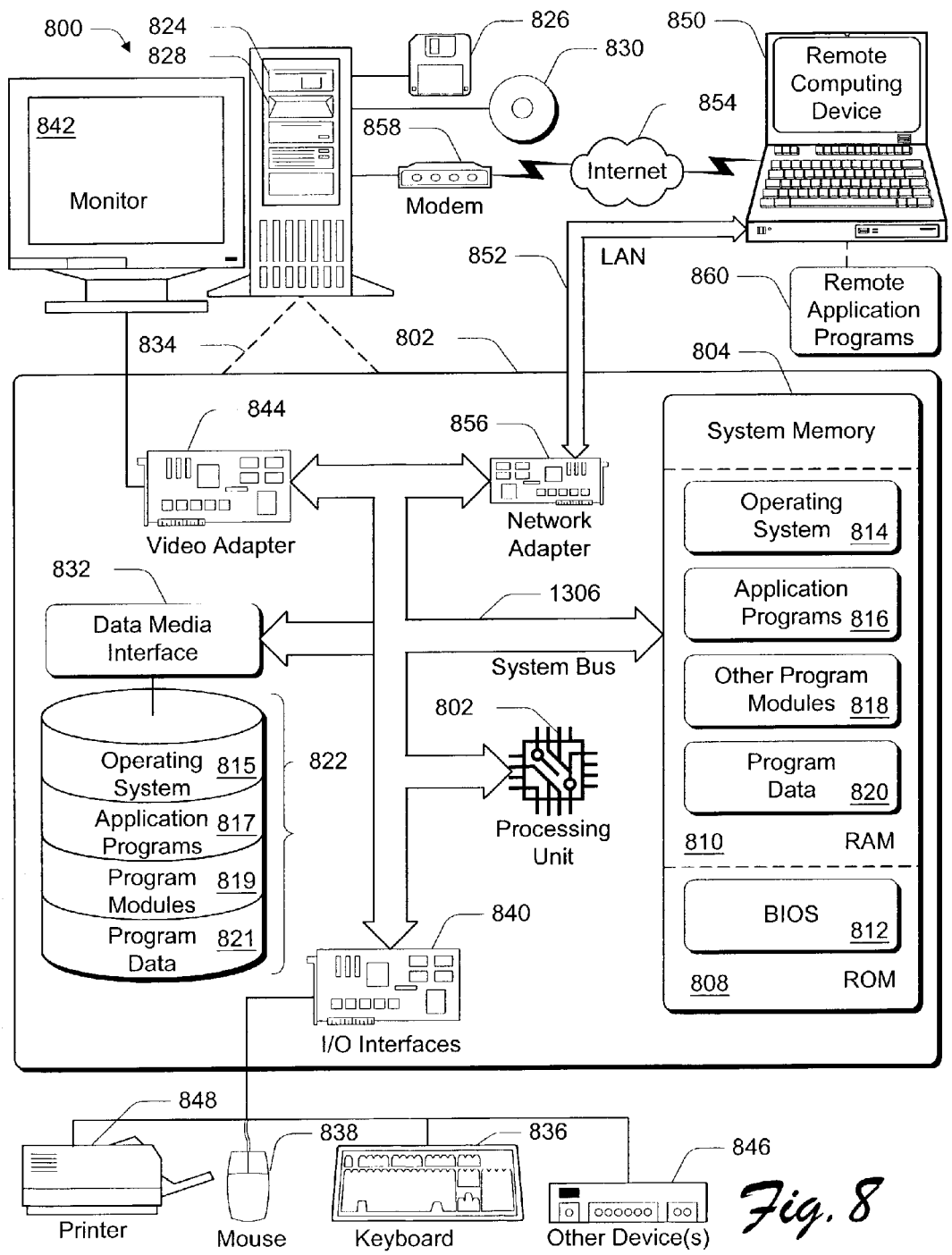
FIG. 8 is a block diagram of an exemplary computer or client device that can be used to implement one or more embodiments.

At the end of this document, FIGS. 7 and 8 illustrate but one exemplary system to provide the reader with an understanding and appreciation of one system that is capable of implementing the embodiments described herein. It is to be appreciated and understood that the description of this exemplary system is not intended to limit application of the claimed subject matter.

Handling Special Event Programs and Other Programs

Many of the embodiments described below are directed to handling so-called "special event programs". Handling of the special event programs can touch upon two different areas of an entertainment system, each with the potential to enhance the user's viewing experience in some way. The first area is the user interface that the user uses to interact with the entertainment system; and the second area is the actual recording function that is performed by the entertainment system. Exactly how the user's experience is enhanced within the context of these two areas will become evident as the description below is read.

Other embodiments are directed to handling programs that are not necessarily special event programs. These programs can be considered as more of the regular or simple series-type of program. Here too the user's viewing experience can be enhanced, as will become apparent.

Special Event Programs

Special event programs can be considered as those programs that are not regular series-type programs. Regular series-type programs are usually those programs that are broadcast, throughout the year, on at least a week-to-week basis, and sometimes on a day-to-day basis. Examples of regular series-types programs are given in the section below entitled "Series Programs".

Special event programs can have various different characteristics that can serve to distinguish them from regular series-type programs. For example, special event programs can include programs that are related in some way to regular series programs. Special event programs can also include such programs as mini-series, short term series, recurring specials, marathons and the like.

The table just below provides some examples of special event programs. The listing and descriptions are not intended to be limiting. Rather, the description is provided to assist the reader in understanding various characteristics and attributes that can be associated with special event programs.

| SPECIAL EVENT PROGRAMS | |
|---|---|
| Program Type | Description |
| Mini-series | Typically a made-for-television show that is broken into several episodes that are broadcast sequentially, often on contiguous nights. |
| Live Sporting Events | These events typically have more than one instance or broadcast, and the instances typically differ from one another. In addition, the channels, days and the times of the broadcast can vary considerably. Examples include "all of the Raiders games for a particular season", "all of the Mets games for a particular season", and the like. |
| Recurring Specials | Specials that recur on a generally standard basis. Examples include year-to-year occurrences of The Academy Awards, The Miss Universe Pageant, and the like. |
| Recurring Multi-part Specials | These types of specials include the 2002 Salt Lake City Winter Olympics, baseball's World Series, and golf's The Masters. |
| Seasonal Series | These types of programs include Monday Night Football and various HBO series. They only air part of the year and do not typically go into Repeat mode like regular series programs. |
| Programs Related to a Series | These types of programs are typically programs that are related to a regular series. Examples of such programs include the final 2 hour special M*A*S*H, the various Gilligan's Island movies, various Brady Bunch movies and specials, the Flintstones movie, and the like. |
| Marathons | Marathons are typically individual program episodes that are broadcast back-to-back for a period of time such as 8 hours. |

Series Programs

Series programs are typically characterized in that they are not generally special event programs. The table just below provides some examples of series programs. This description is not intended to be limiting. Rather, the description is provided to assist the reader in understanding various characteristics and attributes that can be associated with series programs.

| SERIES PROGRAMS | |
|---|---|
| Program Type | Description |
| Simple Series | This type of series is made up of episodes that are not heavily attached to a particular timeline. Seinfeld, StarTrek, The Simpsons, Trading Spaces, and M*A*S*H, are instances of this type of series. While each episode may loosely build on a previous episode, watching the episodes out of order is not an issue. |
| Timeline-based Series | This type of series is made up of episodes that follow a timeline based plot. Watching the episodes out of sequential order or watching |

-continued

SERIES PROGRAMS

| Program Type | Description |
| --- | --- |
| | an episode here and there is not nearly as satisfying as watching each episode in order. An example of a show like this is 24, where twenty-four sequential episodes detail one particular hour in a 24-hour day. |
| High Frequency Series | This type of series is broadcast more frequently than on a weekly basis. Examples include various sports shows, such as Sports Center and The Best Damn Sports Show Period. Some of these types of shows can get updated several times a day. |

Figure 1:
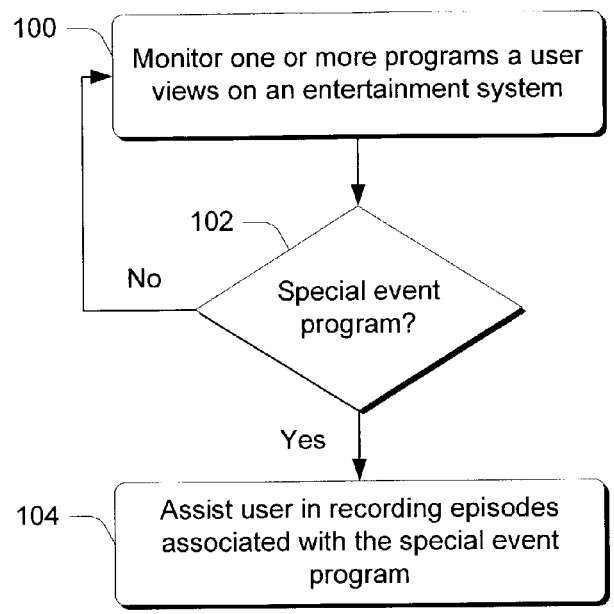
FIG. 1 is a flow diagram that describes steps in a method in accordance with one embodiment.

FIG. 1 is flow diagram that describes steps in a method in accordance with one embodiment. The method can be implemented in any suitable hardware, software, firmware or combination thereof. In one embodiment, the method can be implemented in connection with a system such as the systems shown and described in connection with FIGS. 7 and 8. This method is directed to assisting the user in recording episodes that are associated with a special event program.

Step 100 monitors one or more programs that a user views on an entertainment system. Step 102 determines whether a user is watching a special event program. This step can be implemented by determining the particular program that the user is viewing and then ascertaining, from metadata associated with the program, whether the program satisfies criteria associated with special event programs. Examples of special event programs are given above along with associated characteristics that can be utilized to define criteria that the system can use to make its determination.

If the user is not watching a special event program, the method returns to step 100 and continues to monitor programs. If, on the other hand, step 102 determines that the user is watching a special event program, step 104 assists the user in recording episodes associated with the special event program. Step 104 can be implemented in different ways. For example, step 104 can first prompt the user, via a suitable interface, to ascertain whether they wish to record other episodes associated with the special event program. Alternately or additionally, step 104 can automatically record the other episodes associated with a special event program.

As an example, consider the following. Assume that the user has tuned into the first of a 5-part series on the life of Ernest Shackleton and his Endurance expedition. Assume also that the user is captivated by the program, wishes to view the remaining episodes of the series, but forgets to set up a series record event for the series. In accordance with the embodiment described above, the user's entertainment system recognizes the series episode as a special event program (e.g. by virtue of metadata associated with the particular episode), and can then either automatically record the remaining episodes of the series, or present a user interface to the user that asks the user whether they wish to record the remaining episodes of the series. In this way, the system can enhance the user's experience by providing a degree of assurance that programs the user may with to view are recorded.

As another example, consider the following. Assume that the user is a football fan and loves the Oakland Raiders. Assume also that they tune into the first Raider game of the season in which the Raiders face off against the Pittsburgh Steelers. In this example, the system can recognize the program as a Live Sporting Event and can prompt the user to ascertain whether they wish to record all of the upcoming Raiders or Steelers games. Likewise, another user might tune into The Academy Awards, which is recognized by the system as a special event program in the form of a Recurring Special. The system can then prompt the user to ascertain whether they wish to record next year's episode of The Academy Awards.

As but another example, consider the following. Assume that the user has tuned into the Olympics and, in particular, has viewed the first hockey game between the USA and Russia. The system can recognize the program as a special event program in the form of a Recurring Multi-part Special and can prompt the user to ascertain whether they wish to record other instances of the Olympics broadcast. Alternately or additionally, the system can recognize that the particular program viewed by the user was effectively a Live Sporting Event that will have other different instances in the near-term future. In this situation, the system can either automatically record all of the subsequent Olympic hockey games, or it can prompt the user to ascertain whether the user wishes to record the other instances.

In addition to assisting the user in recording all episodes associated with a special event program, step 104 can assist the user in recording only portions of a particular special event program. For example, if the user is watching Gonzaga's first game in the NCAA tournament, the system can prompt the user to ascertain which of the NCAA games the user would like to have recorded. For example, the user may not care to view every game of the tournament, but rather would only like to see each of Gonzaga's games. In this instance, the user can, through a suitably presented UI, define only "Gonzaga games" as the games that the system is to record.

In addition to assisting the user in recording subsequently broadcast episodes associated with a particular special event program, step 104 can, where possible, attempt to assist the user in recording previously-broadcast episodes of a special event program.

As an example, consider the following. Assume that the user has tuned in, for the first time, to Episode 4 of the Shackleton series. It is often the case that program series such as these are broadcast multiple times. For example, the PBS station may broadcast the 5-part series in August, and then again in December. By knowing this, and by noticing that the program is a special event program as well as the user has not viewed or recorded the previous episodes, the system can prompt the user to ascertain whether they wish to record any of the previously-broadcast episodes, in the event the missed episodes are broadcast again in the future. If the user indicates that they indeed wish to record the missed episodes, the system can simply set up a series record event on the series, and process the EPG data as it is received, to look for the instances or episodes that it is to record.

If the missing episodes are not referenced in the EPG data that the system currently has, the system can set up a hibernation event which essentially enables the system to look for program instances in the EPG data that it is to receive in the future. For example, the frequency of EPG data download is very dependent on the system. On DirecTV, for example, the EPG data is constantly trickling down to the system. On other systems, the system calls up the provider once a day (typically in the middle of the night) and downloads guide data for the next 14 days. Since EPG data is typically transmitted to systems at different times, the hibernation event can look at the new EPG data when it is received.

Once the system executes step 104 to record the desired episodes associated with a special event program, the system can do a couple of different things. For example, if the record event associated with the special event program may have been a one-time record event, it can delete the record event. This might be the case with the Shackleton series as once the user has either watched the entire series or recorded the entire series, it is unlikely that they will wish to again view the series in the near-term future.

Alternately or additionally, the system can recognize that the record event associated with the special event program is of the type that is likely to be re-used by the user. In this case, the system can place the record event into hibernation such that it is not presented to the user in the normal UI that lists programs for which the user or the system has established a record event. This might be the case where the special event program is Monday Night Football. Specifically, after the football season, the Monday Night Football record event will simply clutter up the UI. Accordingly, this record event can be placed into hibernation such that it does not appear in the normal UI until next football season. In many cases, the system can simply look at the EPG data over a period of time—for example, two weeks—and, after finding no matching programs in the EGP data, the record event can be placed into hibernation.

Figure 1A:
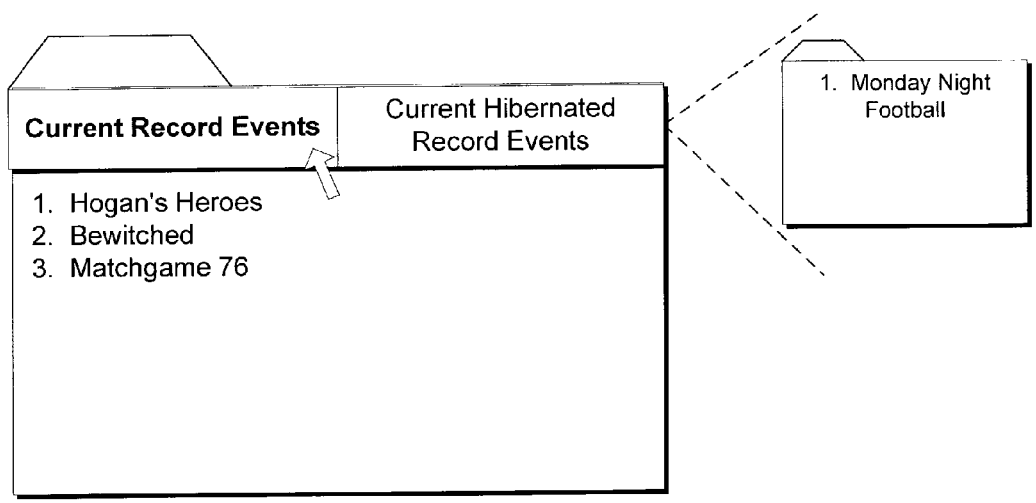
FIG. 1a is a diagram of an exemplary user interface in accordance with one embodiment.

The hibernated record events can be placed, for example, in a special folder or page that is dedicated to hibernation events. For example, FIG. 1a shows an exemplary user interface that displays current record events for the user. Here, the current record events include Hogan's Heroes, Bewitched, and Matchgame 76. Notice that a tab entitled "Current Hibernated Record Events" can be clicked on or otherwise selected by the user to access a folder that contains listings that correspond to record events that have been hibernated. In this example, the Monday Night Football record event has been hibernated. Hibernation is discussed in more detail below in connection with FIG. 3.

Figure 2:
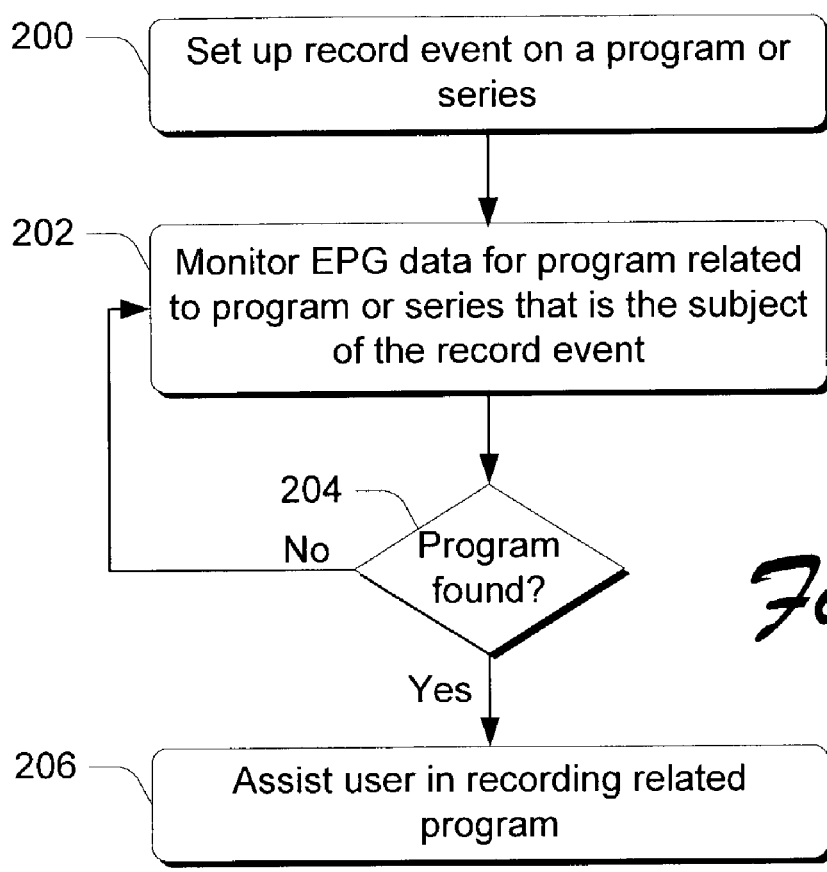
FIG. 2 is a flow diagram that describes steps in a method in accordance with one embodiment.

FIG. 2 is a flow diagram that describes steps in a method in accordance with another embodiment. The method can be implemented in any suitable hardware, software, firmware or combination thereof. In one embodiment, the method can be implemented in connection with a system such as the systems shown and described in connection with FIGS. 7 and 8. This method is directed to assisting the user in recording episodes that are associated with a program for which they have set up a record event.

Step 200 sets up a record event on a program or a series. This step can be implemented by receiving user input, via a user interface, that defines a program or a series to record. Step 202 monitors EPG data for programs related to the program or series that is the subject of the record event. In this embodiment, the programs for which EPG data is monitored need not be the programs or series that are the subject of the record event, although they certainly can be—examples of this are provided below. Step 204 determines whether a program is related with a program or series for which a record event has been set up. If not, the method returns to step 202 to continuing monitoring for related programs. If, on the other hand, step 204 determines that a program is related to a program or series for which a record event has been set up, step 206 assists the user in recording the related program. This step can be implemented by, for example, automatically recording the related program, or by prompting the user to ascertain whether they wish to record the related program. In practice, many times the program for which step 202 monitors will be a special event program, such as a Program Related to a Series or a Marathon, examples of which are provided in the "Special Event Program" table above.

For example, assume that the user has set up a record event to record all of the episodes of Gilligan's Island. Assume also that a program entitled "The Making of Gilligan' Island" is scheduled to air on another channel. The record event set up by the user to record the Gilligan's Island episodes will not typically capture the special event program "The Making of Gilligan's Island." Step 202 can, however, process the EPG data that it receives and look for programs that are related to the Gilligan's Island series. Any suitable heuristics can be used to conduct this search. For example, a simple search can be conducted for key words appearing in the title, e.g. "Gilligan" and "Island". Alternately or additionally, the heuristics can search for actor names and the like.

As another example, consider the following. Assume that a user sets up a record event to record all of the episodes of Dr. Who, which is a weekly series where the plot of one episode is a continuation of the plot of the previous week's episode. Assume also that a 6-show Dr. Who marathon is to be broadcast on a particular Friday night. It is a fairly good assumption that a user who sets up a record event on a weekly series would be interested in recording a marathon. Yet, the marathon might be classified in a manner such that a typical entertainment system would not record the marathon based only on the record event set up to record episodes of the series. In this case, steps 202-206 can provide a high degree of assurance that the marathon will be recorded.

Figure 3:
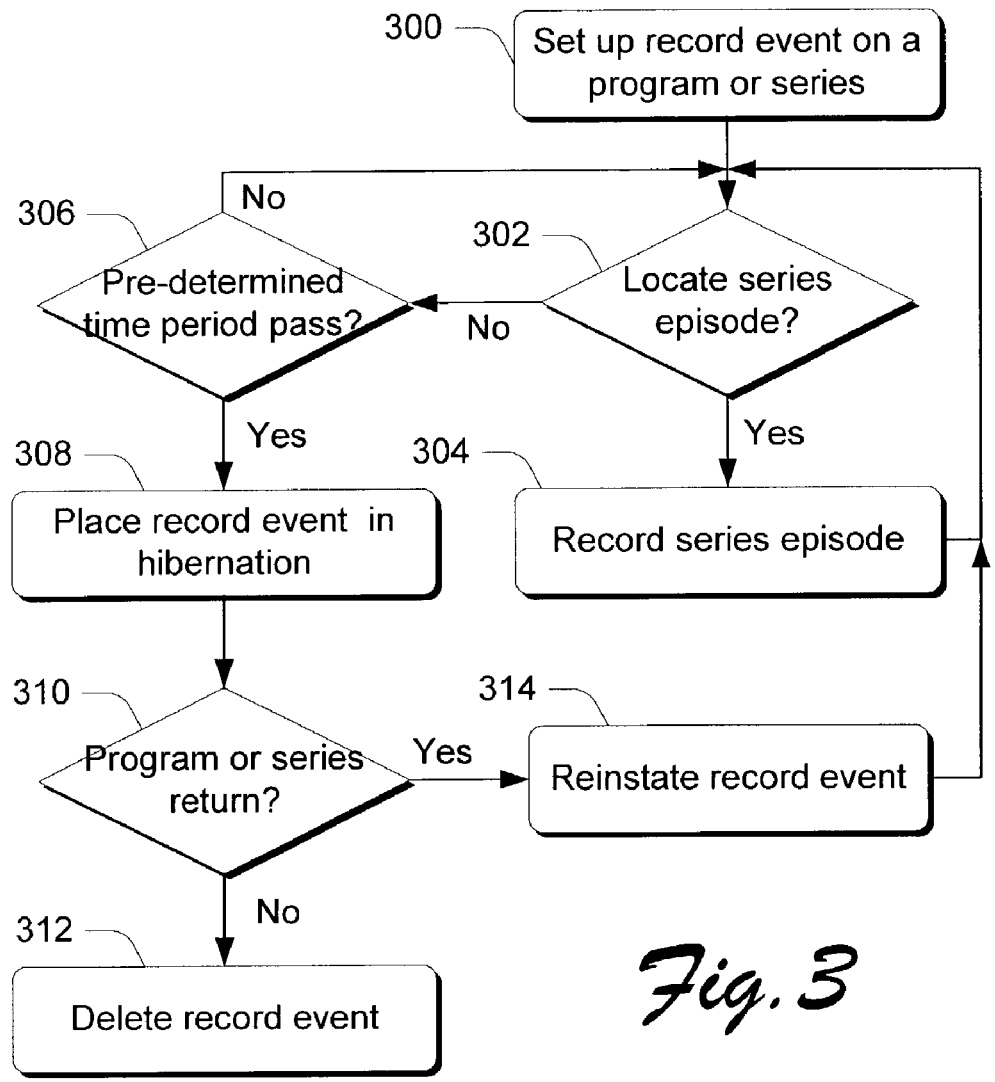
FIG. 3 is a flow diagram that describes steps in a method in accordance with one embodiment.

FIG. 3 is a flow diagram that describes steps in a method in accordance with one embodiment. The method can be implemented in any suitable hardware, software, firmware or combination thereof. In one embodiment, the method can be implemented in connection with a system such as the systems shown and described in connection with FIGS. 7 and 8. This method is directed to maintaining the entertainment system's user interface (UI) as clutter free as possible.

As some background for appreciating the utility of the method about to be described, consider the following. At the beginning of the television season, and at other times as well, new series programs are introduced. Many of the programs are subsequently cancelled after just a few episodes. For example, most if not all of the Seinfeld spin-offs did not last an entire season. If a user sets up a series record event on such a series and the series disappears after a short period of time, the user's system will still have a space dedicated to the record event that the user set up. This space can include physical space on the system's disk, as well as space in the UI dedicated to the record event. For example, the user may have a "My TV" folder in which their record events are maintained. If one or more of the programs that are subject to a record event are no longer being broadcast, typically the user's "My TV" folder will still reflect all of the record events. This is not an efficient use of space, either on the disk or in the UI.

Step 300 sets up a record event on a program or series. Step 302 attempts to locate an episode corresponding to the program or series for recording. This step can typically be implemented by processing the EPG data and looking for instances of the series. If step 302 locates a series episode, step 304 records the series episode and returns to step 302 for the next series episode. If, on the other hand, step 302 does not locate the series episode, step 306 ascertains whether a pre-determined time period has passed. Any suitable time period can be used. For example, one time period might comprise the current television broadcast season. Another time period might comprise one month. If the pre-determined time period has not passed, then the method returns to step 302. If, on the other hand, the predetermined time period has passed, step 308 can place the record event into hibernation. This step can be implemented by, for example, removing the record event's visual indicia from a regularly-presented UI and placing it in a particular folder that is not normally displayed for the user.

An example of such a folder is shown and described in connection with FIG. 1a. Additionally, this step can be implemented by freeing up any disk space reserved for an upcoming episode of which there are none.

If, after a further period of time, the program or series does not return as determined by step 310, step 312 can permanently delete the record event. This step can be implemented by, for example, automatically deleting the record event. This step can also be implemented by giving the user a choice as to which record events to delete. For example, the system can present UI to the user that lists all the hibernating shows and the length of time in hibernation. The user can then check/uncheck the series record events to permanently delete. Alternately or additionally, if the program or series does return as determined by step 310, step 314 can remove the record event from hibernation and reinstate it as a regular record event. Such might be the case, for example, if a Monday Night Football record event goes into hibernation at the end of the football season. In such an instance, it is a good bet that the user would want to resurrect the record event at the start of the next football season.

By removing a record event from a normally presented UI, the amount of clutter in the UI can be desirably reduced. Additionally, the system can make more efficient use of its disk space by freeing up the disk space that was reserved for episodes that have been cancelled.

Handling Season Premiers, Season Finales and Series

As indicated above, new shows or series are typically broadcast at the beginning of the broadcast season. Many times, the start of a new season will involve the broadcast of a season premier. The season premier may pick up with a climatic conclusion where the season finale of the previous season left off. Alternately, the season premier may establish or lay an important foundation that weaves itself throughout the remaining programs of the season.

Figure 4:
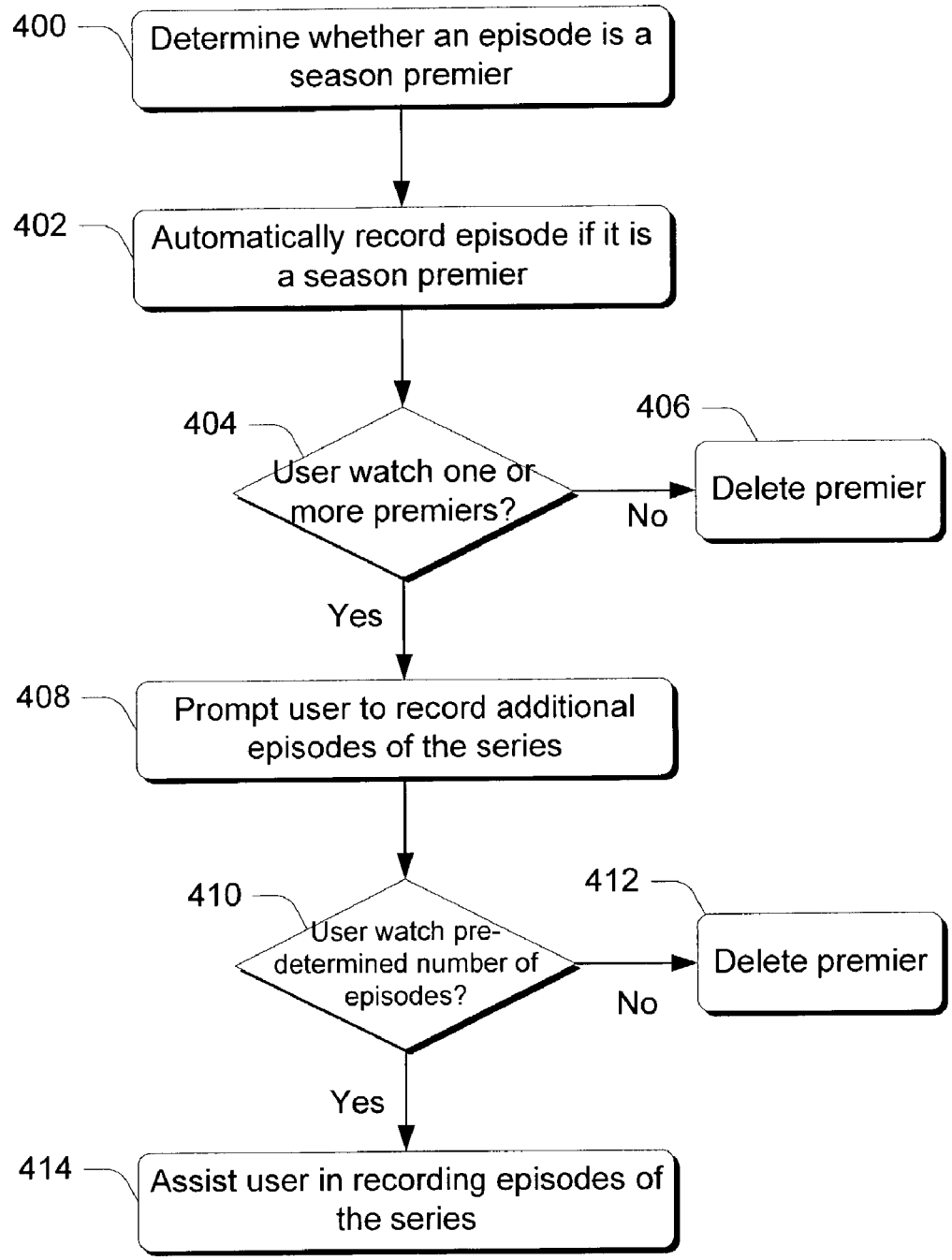
FIG. 4 is a flow diagram that describes steps in a method in accordance with one embodiment.

FIG. 4 is a flow diagram that describes steps in a method in accordance with one embodiment. The method can be implemented in any suitable hardware, software, firmware or combination thereof. In one embodiment, the method can be implemented in connection with a system such as the systems shown and described in connection with FIGS. 7 and 8. This method is directed to recording season premiers that might be of interest to particular users.

Step 400 determines whether an episode is a season premier. A season premier can be a premier of a previously-broadcast series, or, it can be a series premier of a new series. This step can be implemented by the entertainment system processing the EPG data associated with the programs that are to be broadcast. Typically the EPG data will indicate whether the episode is a season premier or not. If the episode is a season premier, then step 402 automatically records the episode. This step can be implemented in a number of different ways. For example, step 402 can automatically record season premiers for only those programs that a user has watched in the past. This approach would work well for programs that have been broadcast in previous seasons. Alternately or additionally, step 402 can automatically record multiple different season premiers or all of the season premiers for a particular season. In this example, the recording is more of a speculative recording in that the user may not have necessarily expressed an interest in one or more of the season premiers that are recorded.

Step 404 determines whether a user watches one or more of the recorded premiers. If the user does not watch one or more of the previously-recorded premiers then, after a pre-determined period of time, step 406 can delete the recorded premier(s). If, on the other hand, the user watches one or more of the previously-recorded premiers, step 408 can prompt the user to ascertain whether they want to record additional episodes of the series. Additionally or alternately, step 410 can determine whether the user watches a pre-determined number of episodes, for example two or three episodes, after or including the season premier. If the user does not watch the pre-determined number of episodes, then step 412 can delete the series premier. If, on the other hand, the user does watch the pre-determined number of episodes, step 414 can assist the user in recording episodes of the series. This step can be implemented by automatically recording the subsequent episodes. Alternately or additionally, this step can be implemented by prompting the user to ascertain whether they wish to have the subsequently-broadcast episodes recorded.

Figure 5:
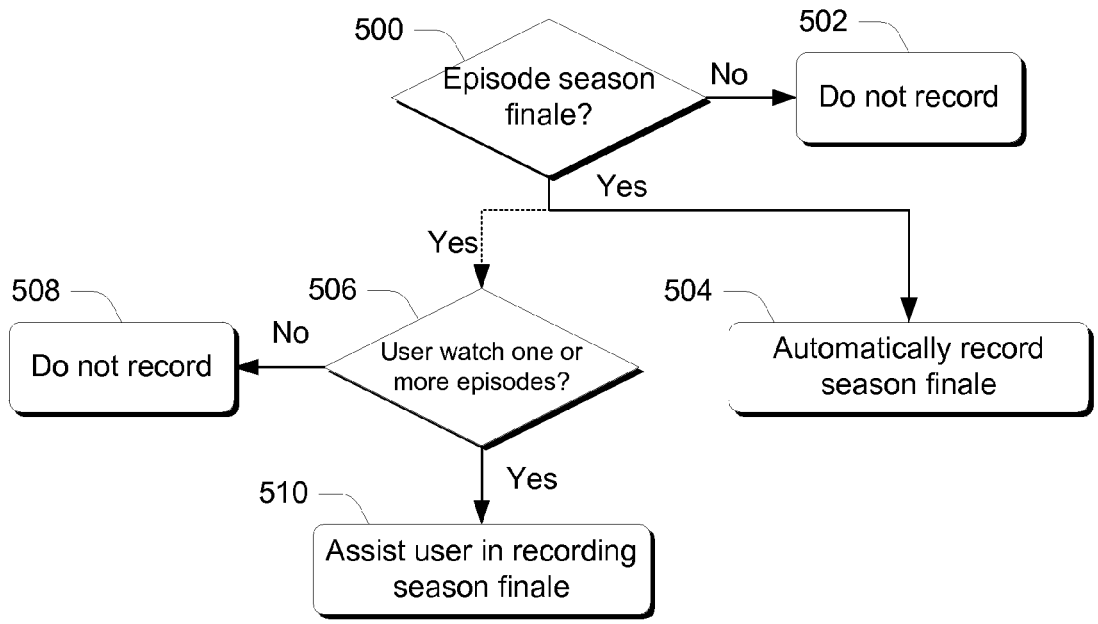
FIG. 5 is a flow diagram that describes steps in a method in accordance with one embodiment.

FIG. 5 is a flow diagram that describes steps in a method in accordance with one embodiment. The method can be implemented in any suitable hardware, software, firmware or combination thereof. In one embodiment, the method can be implemented in connection with a system such as the systems shown and described in connection with FIGS. 7 and 8. This method is directed to recording season finales that might be of interest to particular users.

Step 500 determines whether a particular episode is a season finale. If the episode is not a season finale, step 502 does not record the episode. In accordance with one embodiment, if the episode is a season finale, then step 504 automatically records the episode. This step can be implemented by automatically recording all of the season finales in a speculative-type of recording. Alternately, this step can be implemented by recording a pre-determined number of season finales.

In accordance with another embodiment, if the episode is determined to be a season finale, then step 506 determines whether the user has watched one or more of the episodes. This step can be implemented by processing a history or log that is associated with the user's viewing habits. If step 506 determines that the user has not watched any of the previous episodes associated with a season finale, then step 508 does not record the season finale. If, on the other hand, step 506 determines that the user has watched one or more of the episodes associated with a season finale, step 510 assists the user in recording the season finale. This step can be implemented by either prompting the user to ascertain whether they wish to have the season finale recorded, or by automatically recording the season finale.

Figure 6:
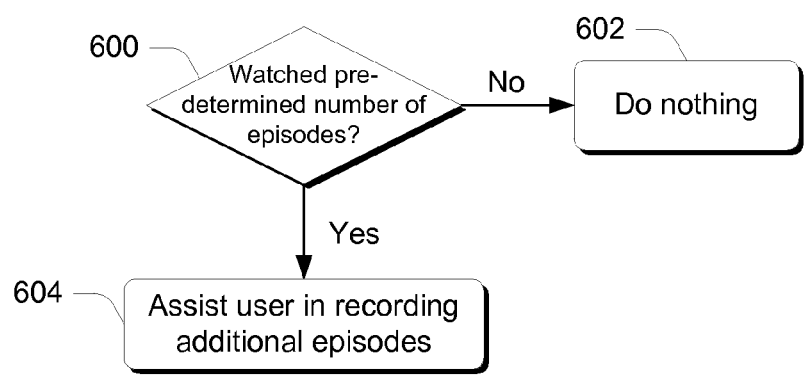
FIG. 6 is a flow diagram that describes steps in a method in accordance with one embodiment.

FIG. 6 is flow diagram that describes steps in a method in accordance with one embodiment. The method can be implemented in any suitable hardware, software, firmware or combination thereof. In one embodiment, the method can be implemented in connection with a system such as the systems shown and described in connection with FIGS. 7 and 8. This method is directed to assisting a user in recording episodes in which they might be interested.

Step 600 determines whether a user has watched a pre-determined number of episodes of a series. If the user has not watched a predetermined number of episodes, then step 602 does nothing. If, on the other hand, step 600 determines that the user has watched a pre-determined number of episodes, then step 604 can assist the user in recording additional episodes. This step can be implemented by prompting the user to ascertain whether they wish for additional episodes to be recorded and/or automatically recording the additional episodes.

As an example, consider the following. A user misses the season premier of Bernie Mac, but catches the next three episodes. This might indicate that the user is interested in the Bernie Mac show. At this point, the system might conclude that the Bernie Mac show is one in which the user is interested. Assume, however, that the user fails to set up a series record on the Bernie Mac show and is out of town for the next two weeks. Since the user is out of town, however, the system is incapable of querying the user to ascertain whether they wish for the additional episodes to be recorded. In this situation, the system might automatically record the additional episodes of Bernie Mac so that the missed episodes are available for the user when they return home.

Exemplary Operating Environment

FIG. 7 illustrates an exemplary environment 700 in which the methods and systems described herein may be implemented. The environment constitutes but one exemplary entertainment system that facilitates distribution of media content and metadata associated with the media content to multiple users. Environment 700 includes one or more content description metadata providers 702, a media content description system 704, one or more program data providers 706, one or more content providers 708, a content distribution system 710, and multiple client devices 712(1), 712(2), . . . , 712(N) coupled to the content distribution system 710 via a broadcast network 714.

Content description metadata provider 702 provides content description metadata associated with media content to media content description system 704. Example content description metadata providers can include, without limitation, movie production companies, movie distribution companies, movie critics, television production companies, program distributors, music production companies, and the like. Essentially, any person, company, system, or entity that is able to generate or supply media content description metadata can be considered a content description metadata provider 702.

Media content description system 704 stores media content description metadata associated with a plurality of metadata categories and stores metadata received from one or more metadata providers 702. In one implementation, the media content description system 704 generates composite metadata based on metadata received from a plurality of metadata providers 702. Media content description system 704 provides the media content description metadata to program data provider 706. Typically, such metadata is associated with many different pieces of media content (e.g., movies or television programs).

Program data provider 706 can include an electronic program guide (EPG) database 716 and an EPG server 718. The EPG database 716 stores electronic files of program data which can be used to generate an electronic program guide (or, "program guide"). The program data stored by the EPG database, also termed "EPG data", can include content description metadata and instance description metadata. For example, the EPG database 716 can store program titles, ratings, characters, descriptions, actor names, station identifiers, channel identifiers, schedule information, and the like.

The EPG server 718 processes the EPG data prior to distribution to generate a published version of the EPG data which contains programming information for all channels for one or more days. The processing may involve any number of techniques to reduce, modify, or enhance the EPG data. Such processes can include selection of content, content compression, format modification, and the like. The EPG server 718 controls distribution of the published version of the EPG data from program data provider 706 to the content distribution system 710 using, for example, a file transfer protocol (FTP) over a TCP/IP network (e.g., Internet, UNIX, etc.). Any suitable protocols or techniques can be used to distribute the EPG data.

Content provider 708 includes a content server 720 and stored content 722, such as movies, television programs, commercials, music, and similar media content. Content server 720 controls distribution of the stored content 722 from content provider 708 to the content distribution system 710. Additionally, content server 720 controls distribution of live media content (e.g., content that is not previously stored, such as live feeds) and/or media content stored at other locations.

Content distribution system 710 contains a broadcast transmitter 724 and one or more content and program data processors 726. Broadcast transmitter 724 broadcasts signals, such as cable television signals, across broadcast network 714. Broadcast network 714 can include a cable television network, RF, microwave, satellite, and/or data network, such as the Internet, and may also include wired or wireless media using any broadcast format or broadcast protocol. Additionally, broadcast network 714 can be any type of network, using any type of network topology and any network communication protocol, and can be represented or otherwise implemented as a combination of two or more networks.

Content and program data processor 726 processes the media content and EPG data received from content provider 708 and program data provider 706 prior to transmitting the media content and EPG data across broadcast network 714. A particular content processor may encode, or otherwise process, the received content into a format that is understood by the multiple client devices 712(1), 712(2), . . . , 712(N) coupled to broadcast network 714. Although FIG. 7 shows a single program data provider 706, a single content provider 708, and a single content distribution system 710, environment 700 can include any number of program data providers and content providers coupled to any number of content distribution systems.

Content distribution system 710 is representative of a head end service that provides EPG data, as well as media content, to multiple subscribers. Each content distribution system 710 may receive a slightly different version of the EPG data that takes into account different programming preferences and lineups. The EPG server 718 creates different versions of EPG data (e.g., different versions of a program guide) that include those channels of relevance to respective head end services. Content distribution system 710 transmits the EPG data to the multiple client devices 712(1), 712(2), . . . , 712(N). In one implementation, for example, distribution system 710 utilizes a carousel file system to repeatedly broadcast the EPG data over an out-of-band channel to the client devices 712.

Client devices 712 can be implemented in multiple ways. For example, client device 712(1) receives broadcast content from a satellite-based transmitter via a satellite dish 728. Client device 712(1) is also referred to as a set-top box or a satellite receiving device. Client device 712(1) is coupled to a television 730(1) for presenting the content received by the client device, such as audio data and video data, as well as a graphical user interface. A particular client device 712 can be coupled to any number of televisions 730 and/or similar devices that can be implemented to display or otherwise render content. Similarly, any number of client devices 712 can be coupled to a television 730.

Client device 712(2) is also coupled to receive broadcast content from broadcast network 714 and communicate the received content to associated television 730(2). Client device 712(N) is an example of a combination television 732 and integrated set-top box 734. In this example, the various components and functionality of the set-top box are incorporated into the television, rather than using two separate devices. The set-top box incorporated into the television may receive broadcast signals via a satellite dish (similar to satellite dish 728) and/or via broadcast network 714. A personal computer may also be a client device 712 capable of receiving and rendering EPG data and/or media content. In alternate implementations, client devices 712 may receive broadcast signals via the Internet or any other broadcast medium.

Each client 712 runs an electronic program guide (EPG) application that utilizes the EPG data. An EPG application enables a TV viewer to navigate through an onscreen program guide and locate television shows of interest to the viewer. With an EPG application, the TV viewer can look at schedules of current and future programming, set reminders for upcoming programs, and/or enter instructions to record one or more television shows.

Exemplary Client Device

The various components and functionality described above can be implemented with a number of individual computers that serve as client devices. FIG. 8 shows components of a typical example of such a component generally at 800. The components shown in FIG. 8 are only examples, and are not intended to suggest any limitations as to the scope of the claimed subject matter, or the types of clients that can be utilized to implement the inventive embodiments described herein.

Generally, various different general purpose or special purpose computing system configurations can be used. Examples of well known computing systems, environments, and/or configurations that may be suitable for use in implementing the described embodiments include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Various functionalities of the different computers can be embodied, in many cases, by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The embodiments described herein includes these and other various types of computer-readable media when such media contain instructions programs, and/or modules for implementing the steps described below in conjunction with a microprocessor or other data processors. The embodiments also include the computer or client device itself when programmed according to the methods and techniques described above.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 8, the components of computer 800 may include, but are not limited to, a processing unit 802, a system memory 804, and a system bus 806 that couples various system components including the system memory to the processing unit 802. The system bus 806 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as the Mezzanine bus.

Computer 800 typically includes a variety of computer-readable media. Computer-readable media can be any available media that can be accessed by computer 800 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 800. Communication media typically embodies computer-readable instructions, data structures, program modules or other data in a modulated data signal such as a carrier wave or other transport mechanism and includes any information delivery media. By way of example, and not limitation, communication media includes wired media such as a wired network or direct-wired connection and wireless media such as acoustic, RF, infrared and other wireless media. Combinations of any of the above should also be included within the scope of computer readable media.

The system memory 804 includes computer storage media in the form of volatile and/or nonvolatile memory such as read only memory (ROM) 808 and random access memory (RAM) 810. A basic input/output system 812 (BIOS), containing the basic routines that help to transfer information between elements within computer 800, such as during start-up, is typically stored in ROM 808. RAM 810 typically contains data and/or program modules that are immediately accessible to and/or presently being operated on by processing unit 802. By way of example, and not limitation, FIG. 8 illustrates operating system 814, application programs 816, other program modules 818, and program data 820.

The computer 800 may also include other removable/non-removable, volatile/nonvolatile computer storage media. By way of example only, FIG. 8 illustrates a hard disk drive 822 that reads from or writes to non-removable, nonvolatile magnetic media, a magnetic disk drive 824 that reads from or writes to a removable, nonvolatile magnetic disk 826, and an optical disk drive 828 that reads from or writes to a removable, nonvolatile optical disk 830 such as a CD ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 822 is typically connected to the system bus 806 through a non-removable memory interface such as data media interface 832, and magnetic disk drive 824 and optical disk drive 828 are typically connected to the system bus 806 by a removable memory interface such as interface 834.

The drives and their associated computer storage media discussed above and illustrated in FIG. 8 provide storage of computer-readable instructions, data structures, program modules, and other data for computer 800. In FIG. 8, for example, hard disk drive 822 is illustrated as storing operating system 815, application programs 817, other program modules 819, and program data 821. Note that these components can either be the same as or different from operating system 814, application programs 816, other program modules 818, and program data 820. Operating system 815, application programs 817, other program modules 819, and program data 821 are given different numbers here to illustrate that, at a minimum, they are different copies. A user may enter commands and information into the computer 800 through input devices such as a keyboard 836 and pointing device 838, commonly referred to as a mouse, trackball, or touch pad. Other input devices (not shown) may include a microphone, joystick, game pad, satellite dish, scanner, or the like. These and other input devices are often connected to the processing unit 802 through an input/output (I/O) interface 840 that is coupled to the system bus, but may be connected by other interface and bus structures, such as parallel port, game port, or a universal serial bus (USB). A monitor 842 or other type of display device is also connected to the system bus 806 via an interface, such as a video adapter 844. In addition to the monitor 842, computers may also include other peripheral output devices 846 (e.g., speakers) and one or more printers 848, which may be connected through the I/O interface 840.

The computer may operate in a networked environment using logical connections to one or more remote computers, such as a remote computing device 850. The remote computing device 850 may be a personal computer, a server, a router, a network PC, a peer device or other common network node, and typically includes many or all of the elements described above relative to computer 800. The logical connections depicted in FIG. 8 include a local area network (LAN) 852 and a wide area network (WAN) 854. Although the WAN 854 shown in FIG. 8 is the Internet, the WAN 854 may also include other networks. Such networking environments are commonplace in offices, enterprise-wide computer networks, intranets, and the like.

When used in a LAN networking environment, the computer 800 is connected to the LAN 852 through a network interface or adapter 856. When used in a WAN networking environment, the computer 800 typically includes a modem 858 or other means for establishing communications over the Internet 854. The modem 858, which may be internal or external, may be connected to the system bus 806 via the I/O interface 840, or other appropriate mechanism. In a networked environment, program modules depicted relative to the computer 800, or portions thereof, may be stored in the remote computing device 850. By way of example, and not limitation, FIG. 8 illustrates remote application programs 860 as residing on remote computing device 850. It will be appreciated that the network connections shown are exemplary and other means of establishing a communications link between the computers may be used.

CONCLUSION

The various methods and systems described above can enhance a user's viewing experience. This can be done by handling special event programs and other programs in a manner that increases the likelihood that programs that are likely to be of interest to a user are recorded for them.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
monitoring, by a client device providing special events programs and series programs to a user, one or more programs a user views on an entertainment system;
determining, by the client device, whether the user is watching a special event program or a series program;
responsive to determining that the user is watching a special event program, assisting the user, by the client device, in recording episodes associated with the special event program by establishing a special event program record event for recording the special event program, wherein the series program is broadcast throughout a year on a regular basis, and wherein the special event program is not the series program;
recognizing, by the client device, that the special event program record event established for the special event program is one of a type of special event program record event that is likely to be reused by the user;
examining EPG data over a predetermined period of time for additional programs that match the special event program record event; and
following the expiration of the predetermined period of time without locating additional programs that match the special event program record event, hibernating, by the client device, the special event program record event, the hibernating comprising removing the special event program record event from a first portion of a user interface presented by the client device that lists programs for which the user has established current record events to be designated second portion of the user interface dedicated to hibernated record events.

2. The method of claim 1, wherein the act of determining comprises ascertaining, from metadata associated with the program, whether the program satisfies criteria associated with special event programs.

3. The method of claim 2, wherein the criteria is associated with that of a mini-series.

4. The method of claim 2, wherein the criteria is associated with that of a live sporting event.

5. The method of claim 2, wherein the criteria is associated with that of a recurring special.

6. The method of claim 2, wherein the criteria is associated with that of a recurring multi-part special.

7. The method of claim 1, wherein the client device comprises a disk storage media for storing recorded programs, wherein moving the special event program record event to the second portion of the user interface dedicated to the hibernated record events further comprises freeing disk space that was reserved for the special event program record event.

8. The method of claim 2, wherein the criteria is associated with that of at least: a mini-series, a live sporting event, a recurring special, a recurring multi-part special, and a program related to a series.

9. The method of claim 1, wherein the act of assisting comprises prompting the user, via a user interface, to ascertain whether the user wishes to record other episodes associated with the special event program.

10. The method of claim 1, wherein the act of assisting comprises automatically recording other episodes associated with the special event program.

11. The method of claim 1, wherein the act of assisting comprises selecting from a group of acts comprising:
- prompting the user, via a user interface, to ascertain whether the user wishes to record other episodes associated with the special event program; and
- automatically recording other episodes associated with the special event program.

12. The method of claim 1, wherein the second portion of the user interface dedicated to hibernated record events is a dedicated folder or page of the user interface for containing hibernated record events including the special event program record event.

13. One or more computer-readable storage media having computer-readable instructions thereon which, when executed by one or more processors, cause the one or more processors to perform the method of claim 1.

14. An entertainment system comprising:
- one or more processors;
- one or more computer-readable media;
- instructions on the computer readable media which, when executed by the one or more processors, cause the one or more processors to:
  - monitor one or more programs a user views on an entertainment system;
  - determine that the user is watching a program that is related to a series for which the user has set up a record event to record episodes of the series by conducting a search using a heuristic comparison of key words in a first metadata associated with the program and key words in a second metadata associated with the series;
  - responsive to determining that the user is watching the program that is related to the series, assist the user in recording episodes associated with the program that is related to the series;
  - process EPG data over a first period of time to identify an episode of the program related to the series;
  - determine whether a predetermined period of time has passed since an episode of the program has been identified while processing the EPG data;
  - remove visual indica of the program from a user interface in response to determining that the predetermined period of time has passed, the user interface including a list of programs associated with respective record events, and wherein each respective record event specifies that one or more episodes of a corresponding program are to be recorded;
  - process additional EPG data over a second period of time to identify an episode of the program that is related to the series after the visual indica of the program has been removed from the user interface; and
  - delete a respective record event of the program in response to determining that an additional predetermined amount of time has passed since an episode of the program has been identified.

15. The entertainment system of claim 14, wherein the instructions cause the one or more processors to determine the program that the user is viewing by ascertaining, from metadata associated with the program, whether the program satisfies criteria associated with programs that are related to the series.

16. The entertainment system of claim 14, wherein the instructions cause the one or more processors to assist the user by prompting the user, via a user interface, to ascertain whether the user wishes to record other episodes associated with the program that is related to the series.

17. The entertainment system of claim 14, wherein the instructions cause the one or more processors to assist the user by automatically recording other episodes associated with the program that is related to the series.

18. The entertainment system of claim 14, wherein the instructions cause the one or more processors to assist the user by selecting from a group of acts comprising:
- prompting the user, via a user interface, to ascertain whether the user wishes to record other episodes associated with the program that is related to the series; and
- automatically recording other episodes associated with the program that is related to the series.

19. The entertainment system of claim 14, wherein the instructions cause the one or more processors to delete a record event that corresponds to an episode that was recorded.

20. The entertainment system of claim 14 further comprising a display for displaying programs for the user.

21. One or more computer-readable storage media having computer-readable instructions thereon which, when executed by one or more processors, cause the one or more processors to:
- monitor one or more programs a user views on an entertainment system;
- determine whether the user is watching a special event program by determining a particular program that the user is viewing and ascertaining, from metadata associated with the particular program, whether the particular program satisfies criteria associated with special event programs;
- responsive to determining that the user is watching a special event program, assist the user in recording episodes associated with the special event program by establishing a special event program record event for recording the special event program;
- determining, over a period of time, whether EPG data includes an additional program that matches the special event program record event;
- following the expiration of a predetermined period of time without locating an additional program that matches the special event program record event, removing the special event program record event associated with the special event program from a first portion of a user interface presented to the user, wherein the user interface includes a list of programs associated with respective current record events, and placing the special event program record event in a designated second portion of the user interface dedicated to hibernated record events;
- determining, over an additional period of time, whether additional EPG data includes an additional program that matches the special event program record event; and
- placing the special event program record event associated with the special event program into the first portion of the user interface when the additional EPG data includes an additional program that matches the special event program record event.

22. The one or more computer-readable media of claim 21, wherein the criteria is associated with that of a mini-series.

23. The one or more computer-readable media of claim 21, wherein the criteria is associated with that of a live sporting event.

24. The one or more computer-readable media of claim 21, wherein the criteria is associated with that of a recurring special.

25. The one or more computer-readable media of claim 21, wherein the criteria is associated with that of a recurring multi-part special.

26. The one or more computer-readable media of claim 21, wherein the criteria is associated with that of at least: a mini-series, a live sporting event, a recurring special, and a recurring multi-part special.

27. The one or more computer-readable media of claim 21, wherein the instructions cause the one or more processors to assist the user by prompting the user, via a user interface, to ascertain whether the user wishes to record the additional program that matches the special event program record event.

28. The one or more computer-readable media of claim 21, wherein the instructions cause the one or more processors to assist the user by automatically recording the additional program that matches the special event program record event.

* * * * *